United States Patent
Mueller et al.

[11] Patent Number: 5,480,946
[45] Date of Patent: Jan. 2, 1996

[54] UNSATURATED UREA POLYSILOXANES

[75] Inventors: Karl F. Mueller, New York; Michael C. Bochnik, Yonkers, both of N.Y.

[73] Assignee: Ciba Geigy Corporation, Tarrytown, N.Y.

[21] Appl. No.: 257,230

[22] Filed: Jun. 9, 1994

Related U.S. Application Data

[63] Continuation-in-part of Ser. No. 108,769, Aug. 18, 1993, abandoned, which is a continuation of Ser. No. 979,387, Nov. 19, 1992, abandoned, which is a continuation of Ser. No. 514,893, Apr. 26, 1990, abandoned.

[51] Int. Cl.$^6$ ................................................. C08F 283/12
[52] U.S. Cl. .................. 525/479; 528/25; 528/26; 528/28
[58] Field of Search ............... 525/479; 526/279; 528/25, 26, 28

[56] References Cited

U.S. PATENT DOCUMENTS

| | | | |
|---|---|---|---|
| 3,509,234 | 4/1970 | Burlant et al. | |
| 4,130,708 | 12/1978 | Friedlander et al. | 528/28 |
| 4,136,250 | 1/1979 | Mueller et al. | 528/29 |
| 4,192,827 | 3/1980 | Mueller et al. | 525/123 |
| 4,233,425 | 11/1980 | Lefertiller et al. | 525/455 |
| 4,320,221 | 3/1982 | Hoffman | 528/69 |
| 4,394,491 | 7/1983 | Hoffman | 525/452 |
| 4,486,577 | 12/1984 | Mueller et al. | 525/474 |
| 4,563,539 | 1/1986 | Gornowicz et al. | 556/421 |
| 4,594,401 | 6/1986 | Takahashi | 526/279 |
| 4,605,712 | 8/1986 | Mueller et al. | 525/474 |
| 4,609,706 | 9/1986 | Bode et al. | 525/7.4 |
| 4,675,237 | 6/1987 | Bravet et al. | 428/425.6 |
| 4,762,887 | 8/1988 | Griswold | 522/99 |
| 4,766,185 | 8/1988 | Ryntz | 528/28 |
| 4,837,289 | 6/1989 | Mueller et al. | 526/279 |
| 4,888,406 | 12/1989 | Ohgush et al. | 528/32 |

OTHER PUBLICATIONS

T. G. Chen, Polym. Mater. Sci. Eng., 57, 565 (1987).
R. W. Dexter et al., Polym. Mater. Sci. Eng. 53, 534 (1985).

*Primary Examiner*—Ralph H. Dean
*Attorney, Agent, or Firm*—Edward McC. Roberts; R. Scott Meece

[57] ABSTRACT

New styrene-functional polysiloxanes are described which are obtained by reaction of aminoalkyl functional polysiloxanes with styrene isocyanates. The styrene functional urea polysiloxanes have improved hydrolytic stability and are useful, either by themselves or in combination with copolymerizable comonomers, in UV- or heat curable biocompatible and oxygen permeable coatings, films or shaped articles, especially in form of oxygen permeable contact lenses.

9 Claims, No Drawings

UNSATURATED UREA POLYSILOXANES

This application is a continuation-in-part of application Ser. No. 08/108,769 filed Aug. 18, 1993; now abandoned which is a continuation of Ser. No. 07/979,387, filed Nov. 19, 1992; now abandoned which is a continuation of Ser. No. 07/514,893, filed Apr. 26, 1990, abandoned.

BACKGROUND OF THE INVENTION

Di- or poly-vinyl functional polymeric compounds, of about 400 to about 10,000 MW, hereinafter called macromers, are known for a long time and are widely used to make UV-curable coatings, films or crosslinked polymeric articles. Typically these compounds are prepared from low molecular weight polyester- or polyether-diols by esterification with acrylic or methacrylic acid, or maleic anhydride; alternatively, they can be more easily prepared by first reacting those polyester- or polyether diols with 2 equivalents of a diisocyanate followed by endcapping with, for instance, 2-hydroxyethyl-methacrylate; such poly-urethane-macromers are described, for instance in U.S. Pat. No. 3,509,234 and U.S. Pat. No. 4,192,827.

An even simpler route to essentially similar urethane-macromers is via the reaction of poly-ester- or poly-ether diols with isocyanate-substituted vinyl monomers, typically a methacrylate such as 2-isocyanatoethyl methacrylate (IEM); relevant patents describing such macromers are U.S. Pat. No. 4,233,425 and U.S. Pat. No. 4,320,221.

The macromer approach has also been applied to polysiloxane (PDMS) dialkanols and PDMS-dialkanol-bis methacrylates are even commercially available. Both urethane based macromer types have also been described, for instance in U.S. Pat. No. 4,136,250, U.S. Pat. No. 4,130,708 and U.S. Pat. No. 4,486,577.

In all instances the linking group between the PDMS-chain and the easily polymerizable vinyl group contains an ester linkage, contribute, either by the hydroxyalkyl- or aminoalkyl methacrylate used in the capping reaction, or by 2-isocyanatoethyl methacrylate. However, this ester linkage constitutes a weakness, if great hydrophilic stability is a requirement, as for example in a PDMS-containing hydrogel.

U.S. Pat. No. 4,837,289 discloses PDMS-tetraalkanols capped wit m-isopropenyl-α,α-dimethyl-benzylisocyanate (TMI), thus providing an ester free linkage group.

TMI is a commercially available compound (American Cyanamid) and has been used in a variety of applications, for instance: in the preparation of vinyl-diols (Polym. Mater. Sci. Eng., 57, 565, (1987); in the preparation of macromer for adhesives, by reaction with polyols, for instances polytetramethylene ether glycol (Fr. Demande FR 2579611 A1, 1986); in high-solids coatings after reaction of a polyester polyol, as described in U.S. Pat. No. 4,609,706; the reaction of TMI with amines is also disclosed in Poly. Mater., Sci. Eng., 53, 534, (1985).

No reaction products of aminoalkyl-substituted polysiloxanes and m-isopropenyl-α,α-dimethylbenzylisocyanate have been described, although the reaction of products of aminoalkyl-substituted PDMS and 2-isocyanto-ethyl methacrylate are described in U.S. Pat. Nos. 4,563,539 and 4,605,712.

It has now been discovered that by reaction of poly-(aminoalkyl)polysiloxane with m-isopropenyl-α,α-dimethylbenzyl isocyanate, or any similar styrenic isocyanate, a PDMS-macromer can readily be prepared, which results in superior properties when incorporated into rigid, oxygen permeable polymers or into hydrogels.

It is an object of this invention to provide an easily polymerizable, hydrolytically stable and rigidity imparting urea-polysiloxane macromer.

It is a further object of this invention to make improved rigid, oxygen permeable contact lenses and oxygen permeable hydrogels by copolymerization of said urea-polysiloxane macromer with vinyl monomers.

DETAILED DESCRIPTION

The novel polysiloxane-urea styrenic macromers are of the general structures:

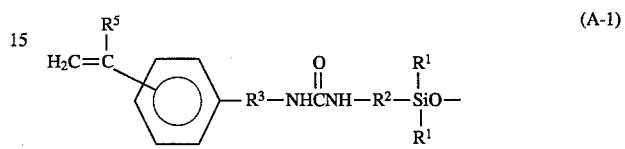

(A-1)

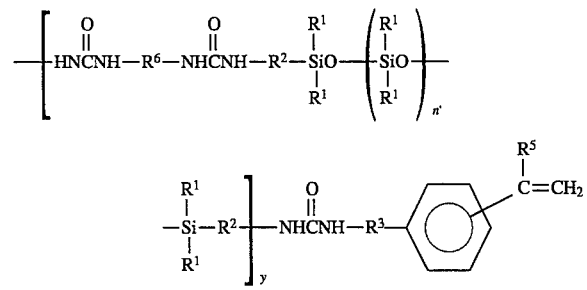

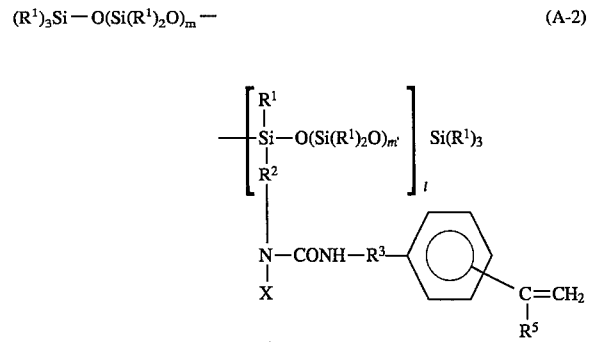

(A-2)

wherein $R^1$ is a methyl-, phenyl or 3,3,3-trifluoropropyl radical, $R^2$ is a divalent saturated linear or branched hydrocarbon radical of from 1–6 carbon atoms, $R^3$ is a direct bond or has the same definition as $R^2$, $R^5$ is hydrogen or methyl, $R^6$ is the divalent residue of a aliphatic, cycloaliphatic or aromatic diisocyanate of structure

OCN—$R^6$—NCO, n and n' are integers from 2 to 250, with the proviso that the sum n+n' is not greater than 250, m and m' are integers from 2 to 200, with the proviso that the sum of m+m' is not greater than 250, y is 0–2, l has a value of 1 to 10, X is hydrogen or has the structure E:

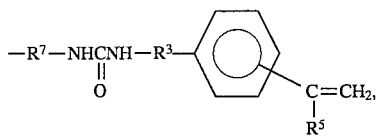

$R^7$ has the same definition as $R^2$.

Preferred are macromers of structure A-1, in which $R^1$ are methyl, $R^2$ is trimethylene, $R^3$ is —$C(CH_3)_2$—

$R^5$ is methyl, y is zero, and n is 5 to 100.

Also preferred are macromers of structure A-1, in which most or all of $R^1$ are methyl, $R^2$ is trimethylene, $R^3$ is —$C(CH_3)_2$—

$R^5$ is methyl, y is 1, n+n' is 10–20, and $R^6$ is an aliphatic or aromatic diradical residue with 6–12 carbon atoms.

Also preferred are macromers of structure A-2, wherein most or all of $R^1$ are methyl, $R^2$ is trimethylene, $R^3$ is —$C(CH_3)_2$—

$R^5$ is methyl,

X is of structure E, $R^7$ is ethylene, m and m' are 5 to 100, with the sum of m+m' not greater than 150, and l is 1–3.

Most preferred are macromers of structure A-1 wherein $R'$, $R^2$, $R^3$ and $R^5$ are as defined as for the preferred A-1 macromer, and n is 10–50.

The macromers of the present invention are made by mixing together an aminoalkyl-functional polysiloxane of either structure $$H_2N—R^2—[SiO(R^1)_2]_nSi(R^1)_2—R^2—NH_2 \quad (C\text{-}1)$$

or $$H_2N—R^2—[SiO(R^1)_2]_nSi(R^1)_2—R^2—NH_2 \quad (C\text{-}1)$$

(C-2)

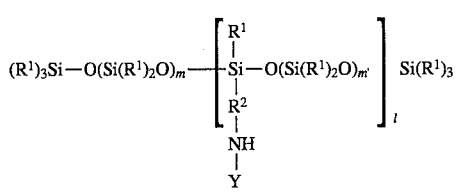

wherein Y is hydrogen or —$R^7NH_2$ with a styrene-isocyanate of structure

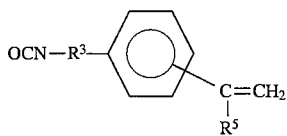

preferably in equivalent amounts, but less or more of the equivalent amount of the styrene-isocyanate may also be used. The reaction proceeds smoothly, with or without catalyst, and is complete when no NCO-groups are detectable by IR-analysis.

Aminoalkyl substituted polysiloxanes are well known and many are commercially available, both, of structures C-1 and C-2. Exemplary polysiloxanes of structure C-1 are those wherein $R^2$ is trimethylene and which have molecular weights of 400–8000. Exemplary polysiloxanes of structures C-2 are those wherein $R^2$ is trimethylene, Y is —$CH_2CH_2$—$NH_2$ and which have molecular weights of 400–8000.

Exemplary styrenic isocyanates are p-isocyanatostyrene and m-isopropenyl-α,α-dimethylbenzyl isocyanate (TMI).

Diisocyanates useful to form chain extended prepolymer intermediates are aliphatic, cycloaliphatic or aromatic diisocyanates selected from the group consisting of ethylene diisocyanate, 1,2-diisocyanatopropane, 1,3-diisocyanatopropane, 1,6-diisocyanatohexane, 1,2-diisocyanatocyclohexane, 1,3-diisocyanatocyclohexane, 1,4-diisocyanatobenzene; bis-(4-isocyanatophenyl)methane, 1,2- and 1,4-toluene diisocyanate; 3,3-dichloro-4,4'-diisocyanatobiphenyl; tris-(4-isocyanatophenyl)methane, 1,5-diisocyanato-naphthalene, hydrogenated toluene diisocyanate; 1-isocyanatomethyl-5-isocyanato-1,3,3-trimethylcyclohexane (=isophorone diisocyanate); 1,6-diisocyanato-2,2-4-(2,4,4)-trimethylhexane, 2,2'-diisocyanatodiethyl fumarate; 1,5-diisocyanato-1-carboxypentane; 1,2-, 1,3-, 1,6-, 1,7-, 1,8-, 2,7- and 2,3-diisocyanatonapthalene; 2,4- and 2,7-diisocyanato-1-methylnaphthalene; 1,4-diisocyanato-methylcyclohexane; 1,3-diisocyanato-6(7)-methyl-napthalene; 4,4'-diisocyanatobiphenyl; 4,4'-diisocyanato-3,3'-dimethoxy-biphenyl; 3,3'- and 4,4'-diisocyanato-2,2'-dimethyl-biphenyl; bis-(4-isocyanatophenyl)ethane; bis(4-isocyanatophenyl ether.

The most preferred diisocyanates are isophorone diisocyanate, 2,2,4-(2,4,4)-trimethylhexane-1,6-diisocyanate or 1,2- or 1,4-toluene diisocyanate.

The diisocyanates can be used in molar ratios of amino functional polysiloxane:diisocyanate of 100:1 to 4:3.

The reaction can be carried out in bulk or in a suitable aprotic solvent, such as a ketone, ester, amide, ether; typical solvents are methyl ethyl ketone, methyl propyl ketone, isopropyl acetate, N,N-dimethylformamide, dipropylene glycol dimethyl ether, dimethyl sulfoxide.

Instead of the aforementioned aprotic, nonreactive solvents, aprotic vinyl monomers can also be used as solvents if the final desired polymer is a copolymer of A-1 or A-2 and a vinyl monomer. If chain extended polysiloxanes are used, they are prepared in a first reaction step by reaction of the diisocyanate with the amino-polysiloxane.

The styrenic unsaturated polysiloxanes can be used by themselves to produce by radiation- or heat-initiated polymerization coatings and films. Preferably though the unsaturated polysiloxanes of the present invention are used in combination with other vinyl monomers to make crosslinked polysiloxane-polyvinyl-block copolymers. Such copolymers are also an object of this invention.

The great variety of monomeric reactants makes it possible to prepare either hard, highly crosslinked copolymers with suitable acrylic, methacrylic or other vinyl monomers, or to prepare soft, rubber-like copolymers with low crosslink density.

It is also possible to prepare by copolymerization with hydrophilic monomers polysiloxane-hydrogels with water contents ranging up to 80%.

Reactive monomers which can be employed together with the unsaturated polysiloxane include mono- or poly-ethylenically unsaturated monomers which undergo polymerization upon exposure to UV-radiation or by chemical initiation.

If the polyunsaturated polysiloxanes are to be used in biocompatible materials, especially in either hard or soft contact lenses, a balance of hydrophilic and hydrophobic properties is required and water-soluble as well as water-insoluble comonomers can be used.

The water-insoluble vinyl monomers ($B_1$) useful in the present invention are:

Acrylates and methacrylates of the general structure:

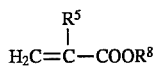

acrylamides and methacrylamides of structure:

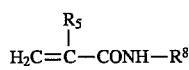

maleates, fumarates and itaconates of structures:

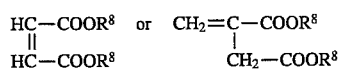

vinyl esters,
$R^8$—COO—CH=$CH_2$
and
vinyl ethers
$CH_2$=CH—O—$R^8$ wherein $R^5$ is hydrogen or methyl, and $R^8$ is a linear or branched aliphatic, cycloaliphatic or aromatic alkyl group with from 1 to 21 carbon atoms and which may contain ether or thioether linkages or a —CO— group; $R^8$ may also be a heterocyclic alkyl group containing oxygen sulfur or nitrogen atoms, or a polypropylene oxide or poly-n-butylene oxide group with from 2 to 50 repeating alkoxy units.

In addition, the $R^8$ group may contain halogen atoms, especially fluorine in form of perfluorinated alkyl groups with from 1–12 carbon atoms; or it may contain siloxane groups with from one to six Si atoms; and may contain —SO— and —$SO_2$-groups. When $R^8$ is part of a fumarate, maleate or itaconate, one of $R^8$ may be hydrogen.

Included among the useful monomers are: methyl-; ethyl-; propyl-; isopropyl-; butyl-; isobutyl-; tert.-butyl-; ethoxyethyl-; methoxyethyl-; benzyl-; 4-tert-butylphenyl-; cyclohexyl-; trimethylcyclohexyl-; isobornyl-; dicyclopentadienyl-; norobornylmethyl-; cyclododecyl-; 1,1,3,3-tetramethylbutyl-; n-butyl-; n-octyl-; 2-ethylhexyl-; decyl-; dodecyl-; tridecyl-; octadecyl-; glycidyl-; ethylthioethyl-; fufuryl-; 2-ethoxyethyl, 2-methoxyethyl, 2-butoxyethyl, 2-(2-ethoxyethoxy)ethyl-; hexafluoroisopropyl-; 1,1,2,2-tetrahydroperfluorododecyl-; tri-, tetra- or penta-siloxanyl silylpropylacrylates and methacrylates especially tris (trimethyl siloxy) siulyl-propyl methacrylate, as well as the corresponding amides; N-(1,1-dimethyl-3-oxobutyl)-acrylamide; mono- and dimethyl fumarate, maleate and itaconate; diethyl fumarate;isopropyl and diisopropyl fumarate and itaconate; mono- and diphenyl and methyl-phenyl fumarate and itaconate; methyl vinyl ether and methoxyethyl vinyl ether; vinyl acetate, vinyl propionate, vinyl benzoate, acrylonitrile, styrene, alpha-methyl styrene and tert-butylstyrene.

Water-soluble monomers ($B_2$) which are also useful comonomers in the present invention are: acrylates and methacrylates of the general structure:

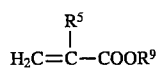

$R^9$ is a hydrocarbon residue of 1 to 10 carbon atoms substituted by one or more water solubilizing groups such as carboxy, hydroxy or tert.-amino, or a polyethylene oxide group with from 2–100 repeating units, or a group which contains sulfate, phosphate, sulfonate or phosphonate groups; $R^5$ is hydrogen or methyl.

Acrylamides and methacrylamides of structure

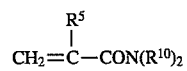

wherein $R_{10}$ is independently hydrogen or an alkyl group with 1–4 carbon atoms, are also useful comonomers.

Maleates and fumarates; or itaconates of structures:

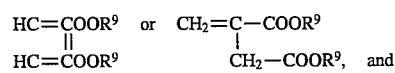

vinyl ethers of structure:

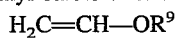

are likewise useful as comonomers, as are N-vinyl-lactams, like N-vinyl-2-pyrrolidone. Included among the useful water soluble monomers are:

2-hydroxyethyl-; 2- and 3-hydroxypropyl-, 2,3-dihydroxypropyl-; polyethoxyethyl-; and polyethoxypropyl- acrylates and methacrylates as well as the corresponding acryl amides and methacryl amides. Sucrose-, mannose-, glucose-, sorbitol acrylates and methacrylates; and di-(-2-hydroxyethyl) maleate; acrylamide and methacrylamide, N-methylacrylamide and methacrylamide, bisacetone-acrylamide; N-(2-hydroxyethyl)acrylamide; N,N-dimethylacrylamide and -methacrylamide; methylol-acrylamide and-methacrylamide; N-vinylformamide and N-vinylacetamide. N,N-dimethyl- and N,N-diethylaminoethyl acrylate and methacrylate as well as the corresponding acrylamides and methacryl amides, N-tert-butylaminoethyl methacrylate and methacrylamide; 2- and 4-vinylpyridine; 4- and 2-methyl-5-vinylpyridine; N-methyl-4-vinyl piperidine; 1-vinyl- and 2-methyl-1-vinyl-imidazole; para- and orthoaminostyrene; dimethyl aminoethyl vinyl ether; N-vinylpyrrolidone; 2-pyrrolidinoethyl methacrylate; acrylic and methacrylic acid; itaconic; cinnamic-, crotonic-, fumaric-, and maleic acids and lower hydroxyalkyl mono- and diesters thereof, such as 2-hydroxyethyl- and di(2-hydroxy)ethyl fumarate,- maleate and itaconate, and 3-hydroxypropyl butyl fumarate, and di-(polyalkoxy)alkyl-fumarates, maleates and itaconates; maleic-anhydride; sodium acrylate and methacrylate, 2-methacryloyloxyethylsulfonic acid, 2-acrylamido-2-methyl-propanesulfonic acid, 2-phosphatoethyl methacrylate, vinylsulfonic acid, sodium vinylsulfonate, p-styrenesulfonic acid, sodium p-styrenesulfonate, and allylsulfonic acid.

Also included are the quaternized derivatives of cationic monomers: obtained by quaternization with selected alkylating agents like halogenated hydrocarbons such as methyl iodide, benzyl chloride or hexadecyl chloride; epoxides like glycidol, epichlorohydrin, ethylene oxide; dimethyl sulfate; methyl sulfate; propane sultone.

Preferred monomers for making hard polymers are, in amount of 10–90% (w/w): methyl methacrylate, cyclohexyl methacrylate, trimethylcyclohexyl methacrylate, isobornyl methacrylate, isopropyl methacrylate, isobutyl methacrylate, tert-butyl methacrylate; trifluoroethyl methacrylate, hexafluorisopropyl methacrylate, or 1,1-dihydro-heptafluorobutyl methacrylate; styrene, tert-butylstyrene, or mixtures thereof, and tris(trimethylsiloxy)silylpropyl methacrylate.

For soft polymers the preferred monomers are: methyl acrylate; 2-ethylhexyl acrylate, n-butyl acrylate, n-butyl methacrylate, n-octyl acrylate, 2-ethoxyethyl acrylate, 2-methoxy-ethyl acrylate and methacrylate, tris-(trimethylsiloxy)-silylpropyl methacrylate and $R_f$-alkylene acrylate and methacrylate, where $R_f$ is a perfluoroalkyl group with 1–20 C-atoms and akylene is $C_1$–$C_4$-alkylene. Preferred comonomers for making hydrogels are: 2-hydroxyethyl methacrylate; 2-hydroxyethyl acrylate; N,N-dimethylacrylamide; acrylic and methacrylic acid, N-vinyl-2-pyrrolidone or mixtures thereof.

A wide range of polyvinyl compounds ($B_3$) can be used in addition to the monovinyl compounds. Indeed, from 0 to 50% by weight of the total monomer can be a di- or triolefinic monomer, for example:

Allyl acrylate and methacrylate, ethylene glycol-, diethylene glycol-, triethylene glycol-, tetraethylene glycol-, and generally polyethylene oxide glycol diacrylates and dimethacrylates; 1,4-butanediol and poly-n-butylene oxide glycol diacrylates and dimethacrylates; propylene glycol and polypropylene oxide glycol diacrylates and dimethacrylates; thiodiethylene glycol diacrylate and dimethacrylate; neopentylene glycol diacrylate and dimethacrylate; trimethylolpropane tri and tetraacrylate; pentaerythritol tri- and tetraacrylate; divinylbenzene; divinyl ether; divinyl sulfone; 1,3-bis (3-methacryloxy propyl) tetramethyl disiloxane, 1,3-bis (3-methacryloxypropyl) tetra (trimethylsiloxy) disiloxane and the corresponding acrylatees; bisphenol A diacrylate or dimethacrylate; methylene bisacrylamide or methacrylamide, dimethylene bisacrylamide or methacrylamide; N,N'-dihydroxyethylene bisacrylamide or methacrylamide; hexamethylene bisacrylamide or methacrylamide; decamethylene bisacrylamide or methacrylamide; allyl- and diallyl maleate, triallyl melamine, dialyl itaconate, diallyl phthalate, triallyl phosphite, polyallyl sucrose, sucrose diacrylate, glucose dimethacrylate; also, unsaturated polyesters, such as poly-(alkylene-glycol maleates) and poly(alkylene-glycol fumarates), like poly(propylene glycol maleate) and poly(polyalkyleneoxide glycol maleate);.

Macromeric divinyl compounds can also be used for copolymerization like polyethylene oxide dimethacrylates, polytetraethylene oxide dimethacrylates (U.S. Pat. No. 4,192,827) or polysiloxane dimethacrylates, (U.S. Pat. No. 4,605,712) or perfluoroether dimethacrylates.

The polyvinyl-polysiloxane of this invention are used either by themselves or together with the mentioned comonomers to make oxygen permeable polymers in a last synthesis step by free radical copolymerization, either in bulk or in the presence of small amounts of solvents. The polymerization is suitably carried out with a free radical generating initiator at a temperature in the range from about 40° C. to about 105° C., the preferred temperature ranges being between about 50° C. and about 100° C. These initiators are preferably peroxides or azo catalysts having a half-life at the polymerization temperature of at least 20 minutes. Typical useful peroxy compounds include; isopropyl percarbonate, tert-butyl peroctoate, benzoyl peroxide, laurylperoxide, decanoyl peroxide, acetyl peroxide, succinic acid peroxide, methyl ethyl ketone peroxide, tert-butyl peroxyacetate, pelargonyl 2,5-dimethyl-2,5-bis(2-ethyl-hexanoylperoxy) hexane, p-chlorobenzoyl peroxide, tert-butylperoxy-butyrate,tert-butyl peroxymaleic acid, tert-butylperoxy-isopropyl carbonate, bis(1-hydroxycyclohexyl) peroxide; azo compounds include: 2,2-azo-bis-isobutyronitrile; 2,2'-azo-bis-(2,4-dimethylvaleronitrile); 1,1'-azo-bis (cyclohexane carbonitrile), 2,2'-azo-bis(2,4-dimethyl-4-methoxy-valeronitrile).

Other free radical generating mechanisms can be employed, such as x-rays, electron-beams and UV-radiation. Preparation of contact-lens blanks by UV radiation in the presence of a photo-initiator such as diethoxyaceto-phenone, 1-hydroxycyclohexyl phenylketone, 2,2-dimethoxy-2-phenylacetophenone, phenothiazine, diisopropylxanthrogen disulfide, benzoin and benzoin derivatives is a preferred method.

The amount of initiator can vary from 0.002% to 1% by weight of the monomer and macromer, but is preferably from 0.03 to 0.3% by weight thereof.

A preferred laboratory method of preparing the polymer, in the form of a cylinder, comprises the filling of flexible polymer tubing with the preferred composition of macromer, monomers, and catalyst and reacting the mixture for approximately 2 hours at 80° C. The finished article is removed by slitting the tubing longitudinally and stripping it away from the polymer article.

Another preferred method for preparing the polymer is by irradiation with ultraviolet light in the presence of a photo-initiator and using plastic molds which are UV transparent, such as molds made of polypropylene or other UV-permeable plastics, or by making coatings and films by UV-curing.

The polymerization is preferably carried out in an inert atmosphere if done in open molds. It is known that oxygen inhibits polymerization and gives rise to extended polymerization times. If closed molds are used to form the article, the molds are composed of inert materials having low oxygen permeability and non-stick properties. Examples of suitable molding materials are poly(tetrafluoroethylene), such as TEFLON®, silicone rubber, polyethylene, polypropylene and polyester, such as MYLAR®. Glass and metallic molds may be used if a suitable mold-releasing agent is employed.

The instant invention also relates to a polymer, suitable as a bicompatible, oxygen permeable polymer, especially for use in contact lenses, comprising the crosslinked copolymerization product of (A) from about 10 to about 100% by weight of said polymer of a polysiloxane macromer of formula A-1 or A-2 having a number-average molecular weight from about 400 to about 10,000, said macromer containing at least two terminal polymerizable olefinic groups, said groups being attached to the polysiloxane through a urea linkage, and (B) from 90% to 0% by weight of said polymer of one or more mono-, di- or trifunctional vinyl monomers polymerizable by free radical polymerization.

More particularly, the instant invention relates to a polymer, suitable for use in contact lenses, comprising the crosslinked copolymerization product of (A) from about 15 to about 90% by weight of said polymer of a polysiloxane macromer having a number-average molecular weight from about 800 to about 10,000, said macromer containing two terminal, polymerizable olefinic groups, said macromer having the structure of formula A-1 or A-2 and (B) from about 85 to about 10 by weight of said polymer of water-soluble or water-insoluble monomers or mixtures thereof, said monomers being monoolefinic, diolefinic or a mixture of monoolefinic and diolefinic monomers.

The term "molecular weight", as used herein, refers to number-average molecular weight.

The polymers of this invention can be tailored so as to be useful either as hard contact lens material or as soft contact lens material. Different comonomers and different levels of polysiloxane macromer are required to get optimal performance in either contact lens type.

In choosing the polysiloxane component and the vinyl monomer for a hard contact lens composition, it is important to arrive at a mixture which will give clear polymers with sufficient dimensional stability and oxygen permeability. Sometimes a mixture of comonomers is advantageous in avoiding phase-separation and thereby opacity. Also, it is easier to obtain clear products with polysiloxanes of relatively low molecular weight than with high molecular weight polysiloxanes. Polysiloxanes with a short chain length between crosslinks also give harder, more dimensionally stable polymers; however, their oxygen permeability is reduced compared to polysiloxanes with longer chain length and therefore lower crosslink density. By a judicious choice of monomer(s) and polysiloxane macromer, one is thus able to tailor to a considerable degree the physical properties and oxygen permeability of the instant silicone polymers, from hard and rigid to rubbery and soft. In addition to hard and soft contact lenses, because of their good tissue compatibility and oxygen permeability and strength and elasticity, the polymers of the present invention are also particularly suitable for use as intramuscular and subcutaneous implants in warm-blooded animals. For the same reasons, the materials of the present invention may be fashioned into substitute blood vessels or extra-corporeal shunts.

For preparing hard contact lenses, the preferred polymer comprises the crosslinked copolymerization product of (A) from 15 to 80% of a polysiloxane macromer of formula $A_1$ or $A_2$, and (B) from 85 to 20% by weight of a mixture of comonomers of which, based on the total weight of comonomers, is ($B_1$) 100 to 65% by weight of a water-insoluble monoolefinic monomers or mixtures thereof, ($B_2$) 0 to 35% by weight of a water-soluble monoolefinic monomer or mixture thereof, and ($B_3$) 0 to 35% by weight of a diolefinic monomer. The preferred water-insoluble monomers are methyl methacrylate, cyclohexyl methacrylate, tris(trimethyl-siloxanyl)silyl-propyl methacrylate, trifluoroethyl methacrylate, hexafluoroisopropyl methacrylate, 1,1,-dihydroheptafluorobutylmethacrylate, trimethylcyclohexyl methacrylate, isobornyl methacrylate, tert-butyl methacrylate, tert-butyl-styrene or mixtures thereof. The preferred water-soluble monomers are 2-hydroxyethyl methacrylate, N,N-dimethylacrylamide, acrylic acid, methacrylic acid, maleic anhydride or N-vinyl-2-pyrrolidone or mixtures thereof, and the preferred diolefinic monomers are ethylene glycol dimethacrylate, neopentyl glycol diacrylate or methacrylate, and bis-(3-methacryloxy propyl) tetramethyl disiloxane and bis(3-methacryloxypropyl) tetra(trimethylsiloxy) disiloxane.

A preferred embodiment of the instant polymers useful for making hard copolymers, for instance for hard contact lenses, is the polymer comprising the copolymerization product of (A) 20 to 75% by weight of a polysiloxane of formula A-1 where $R^1$ and $R^5$ are methyl, $R^2$ is trimethylene, $R^3$ is

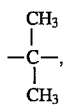

and n is 10–50, and (B) 80 to 25% by weight of a mixture of comonomers of which, based on the total weight of comonomers, is ($B_1$) 95 to 65% by weight of a water-insoluble monoolefinic monomer or mixture thereof, and ($B_2$) 5 to 35% by weight of a water-soluble monoolefinic monomer or mixture thereof.

Another preferred embodiment of the instant polymers useful for making hard copolymers for instance hard contact lenses, is the polymer comprising the copolymerization product of (A) 20 to 75% by weight of a polysiloxane of formula A-1 where $R^1$ and $R^5$ are methyl, $R^2$ is trimethylene, $R^3$ is

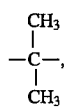

n is 10–50, y=1, and $R^6$ is the divalent residue of isophorone diisocyanate; 2,2,4-(2,4,4)-trimethylhexane-1,6-diisocyanate or toluene diisocyanate; and (B) 80 to 25% by weight of comonomers of which, based on the total weight of comonomers, is ($B_1$) 95 to 65% by weight of a water-insoluble monoolefinic monomer or mixture thereof, ($B_2$) 5 to 35% by weight of a water-soluble monoolefinic monomer or mixture thereof, and ($B_3$) 0 to 20% by weight of a diolefinic monomer.

A still more preferred embodiment of the instant polymer comprises the copolymerization product of (A) 20 to 75% by weight of a polysiloxane of formula A-1 where $R^1$ is methyl, and (B) 80 to 25% by weight of a mixture of comonomers of which, based on the total weight of comonomers, is ($B_1$) 95 to 65% by weight of a monomer selected from the group consisting of methyl methacrylate, cyclohexyl methacrylate, trimethylcyclohexyl methacrylate, isobornyl methacrylate, 2,2,2-trifluoroethyl methacrylate, hexafluoroisopropyl methacrylate, 1,1-dihydro-heptafluorobutyl methacrylate, tert-butyl methacrylate, styrene and tert-butylstyrene, ($B_2$) 5 to 35% by weight of a monomer selected from the group consisting of acrylic acid, methacrylic acid, N,N-dimethylacrylamide, and maleic anhydride, ($B_3$) 0 to 20% by weight of ethylene glycol dimethacrylate, neopentyl glycol diacrylate, or bis-(3-methacryloxypropyl)-tetramethyl-disiloxane.

Another preferred embodiment of the instant polymers comprises the copolymerization product of (A) 20 to 75% by weight of a polysiloxane of formula A-2 where $R^1$ and $R^5$ are methyl, $R^2$ is trimethylene, $R^3$ is

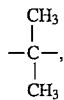

X is of structure (E), $R^7$ is ethylene,
n=10–50,
l=1–3, and (B) 80 to 25% by weight of a mixture of comonomers of which, based on the total weight of comonomers, is ($B_1$) 95 to 65% by weight of a monomer selected from the group consisting of methyl methacrylate, cyclohexyl methacrylate, trimethylcyclohexyl methacrylate, isobornyl methacrylate, 2,2,2-trifluoroethyl methacrylate, hexafluorisopropyl methacrylate, 1,1-dihydroheptafluorobutyl ethacrylate, tert-butylmethacrylate, styrene and tert-butylstyrene, 3-methacryloxypropyl-tris(trimethylsiloxy) silane, ($B_2$) 5 to 35% by weight of a monomer selected from the group consisting of acrylic acid, methacrylic acid, N,N-dimethylacrylamide, and maleic anhydride, and ($B_3$) 0 to 20% by weight of ethylene glycol dimethacrylate or neopentyl glycol diacrylate, or bis-(3-methacryloxy propyl)-tetramethyl-disiloxane.

For preparing soft copolymers, such as soft contact lenses with low water absorption, the preferred polymer comprises the crosslinked, copolymerization product of (A) 30 to 80% by weight of a polysiloxane macromer of formula A-1, and (B) 70 to 20% by weight of a mixture of comonomers of which, based on the total weight of comonomers, is ($B_1$) 100 to 89% by weight of a water-insoluble monoolefinic monomer or mixture thereof, ($B_2$) 0 to 10% by weight of a water-soluble monoolefinic monomer or mixture thereof, and ($B_3$) 0 to 1% by weight of a diolefinic monomer.

For making soft copolymers, such as soft contact lenses, the preferred water-insoluble monomers are methyl acrylate, ethyl acrylate or methacrylate, n-butyl acrylate or methacrylate, n-hexyl acrylate or methacrylate, 2-ethylhexyl acrylate or methacrylate, n-octyl acrylate or methacrylate, n-decyl acrylate and oligo-siloxanyl alkyl methacrylates, like tris-(trimethyl siloxanyl)silyl-propyl-methacrylate, and $R_f$-alkylene acrylates and methacrylates, where $R_f$ is perfluoroalkyl group with 1–10 C-atoms and alkylene is alkylene with 1–5 C-atoms.

For preparing hydrogels, for instance for hydrogel contact lenses, the preferred polymer comprises the crosslinked copolymerization product of 20 to 60% by weight of a polysiloxane macromer of formula A-1 or A-2 and (B) 80 to 40% by weight of a mixture of comonomers of which, based on the the total weight of comonomers, is ($B_1$) 0 to 30% by weight of a water-insoluble monoolefinic monomer or mixture thereof, ($B_2$) 100 to 69% by weight of a water-soluble monoolefinic monomer or mixture thereof, and (B3) 0 to 1% by weight of a diolefinic monomer.

The preferred water-soluble monomers are N,N-dimethylacrylamide, N-vinyl-2-pyrrolidone, 2-hydroxyethyl methacrylate, acrylamide or mixtures thereof.

The polysiloxane-copolymers of this invention may also be treated by any of the commonly used methods used to increase the wettability of hydrophobic surfaces, such as plasma-treatment and irradiation-grafting and oxidation.

The contact lenses made from the polymers of this invention are hydrolytically stable, biologically inert, transparent and sufficiently permeable to oxygen to allow the transport of oxygen sufficient to meet the requirements of the human cornea.

The following examples are presented for the purpose of illustration only and are not to be construed to limit the nature and scope of the instant invention in any manner whatsoever.

In the following examples, specific oxygen permeability ($O_2$-DK) is determined by measuring dissolved oxygen permeability at indicated temperatures and thickness with a CREATECH PERMEOMETER, using a polarographic electrode in an air-saturated aqueous environment and is expressed in units:

$$O_2 DK = \frac{cm^3(STP) \times cm}{cm^2 \times sec \times cmHg} \cdot 10^{10} \text{ (barrers)}$$

As reference materials for $O_2$-DK measurements, water swollen poly(2-hydroxyethyl methacrylate) (poly-hema; 39% water content; a common soft-lens material) and CAB, cellulose-acetate-butyrate (an oxygen-permeable hard-lens material) are used; for hardness CAB and poly(methyl methacrylate) are used as reference materials. The $O_2$-DK, Shore-D and contact angle values for these materials are given below.

Hardness is determined using a Shore-D durometer on polished surfaces of center cut buttons of 10 mm diameter and 8 mm height.

| Reference Material | $O_2$-DK (at 0.25 mm/23° C.) | Shore-D |
|---|---|---|
| poly-hema (39% $H_2O$) | 6.5 | — |
| poly(methyl methacrylate) | <0.1 | 92 |
| cellulose-acetate-butyrate | 8.2 | 80 |

The following examples describe the synthesis of vinyl-urea capped polysiloxanes.

EXAMPLE 1

56.62 g (32.1 m mole) of an α,ω-di-propylamino-poly-(dimethyl siloxane) of 1770 MW (Shin Etsu Corp. No. X-22-161A) are placed in a 100 mL 3-neck round bottom flask fitted with a mechanical stirrer, gas inlet tube and thermometer. The diamine is cooled with an ice-water bath and kept under a dry air atmosphere. 9.97 g (64.3 m moles) 2-isocyanatoethyl methacrylate (IEM) are added and the mixture is stirred. After 30 min. the ice-water bath is removed and the contents are stirred for an additional 4 hours. IR-analysis of the clear, light-yellow viscous liquid shows no NCO peak present (~2350 $cm^{-1}$).

EXAMPLE 2

56.52 g (32.0 m moles) of the aminopropyl-capped PDMS of Example 1 are placed in a 100 mL 3-neck round bottom flask fitted with a mechanical stirrer, gas inlet tube and thermometer. The diamine is cooled with an ice-water bath and kept under a dry air atmosphere. 12.90 g (64.1 m moles) of m-isopropenyl-α,α-dimethylbenzyl isocyanate (TMI) are added while stirring. After 2 hours the mixture becomes very thick and 69.42 g of trimethylcyclohexyl methacrylate (TMMA) are added. The ice-water bath is removed and the contents are stirred for an additional 4 hours to yield a 66.1% solution of α-methylstyrene capped poly(dimethylsiloxane) in TMMA.

EXAMPLE 3

49.87 g (83.2 m eqiv.) of a poly-(dimethylsiloxane) with —CH$_2$CH$_2$—CH$_2$NHCH$_2$CH$_2$NH$_2$ pendant groups and MW 1200 (SWS-Silicones No. F-756) are placed in a 100 mL 3-neck round bottom flask fitted with a mechanical stirrer, gas inlet tube and thermometer. The contents are cooled with an ice-water bath and kept under a dry air atmosphere. 16.70 g (82.9 m moles) of m-isopropenyl-α,α-dimethylbenzyl isocyanate (TMI) are added while stirring. The mixture becomes viscous after 5 min. and 33.36 g trimethylcyclohexyl methacrylate (TMMA) are added. The contents are stirred for an additional 3 hours to yield a α-methylstyrenic PDMS as a 66% solution in TMMA.

EXAMPLE 4

48.24 g (80.4 m equiv. amine) of the poly-amino-poly-(dimethyl siloxane) of Example 3 is placed in a 100 mL 3-neck round bottom flask fitted with a mechanical stirrer, gas inlet tube and thermometer. The amine is cooled with an ice-water bath and kept under a dry air atmosphere. 12.48 g (80.4 m moles) of 2-isocyanatoethyl methacrylate (IEM) are added and the mixture is stirred After 5 min. the mixture becomes viscous and 30.67 g TMMA are added. The ice-water bath is removed and the contents are stirred for an additional 3 hours under dry air, to yield a methacrylate functional PDMS as a 66% solution in TMMA.

The following examples describe the synthesis of Polysiloxane-Hydrogels

EXAMPLE 5

5.76 g (3.52 m moles) of an α,ω-di-propylamino-poly-(dimethyl siloxane) of 1636 MW (Shin Etsu Corp. No. X-22-161A) and 7.18 g N,N-dimethylacrylamide are placed in a one ounce jar and stirred, forming a cloudy mixture. The mixture is cooled in an ice-water bath and 1.50 g (7.45 m moles) of m-isopropenyl-α,α-dimethylbenzyl isocyanate (TMI) added. The solution turns clear and is stirred for 2 hours. 0.29 g Benzoin methyl ether (BME) are added and dissolved. The mixture is degassed by applying vacuum and sparged with nitrogen (3 cycles), then is poured into a MYLAR-lined glass mold, held together by clamps and using 0.5 mm thick silicone cord as spacer. The mold is exposed to UV light from a SYLVANIA Blacklite-Blue fluorescent lamp for 4 hours, after which time the mold is opened and the clear, stiff polymer sheet is removed. It is cut into rectangular pieces for testing.

After equilibration in distilled water, hydrogels with an equilibrium water content of 25.4% are obtained.

EXAMPLE 6

Using the procedure described in Example 5, but using instead of TMI the equivalent amount of 2-isocyanatoethyl methacrylate (IEM), clear hydrogels are prepared, having an equilibrium water content of 25.8%.

EXAMPLE 6a

Cut strips of polymer from Example 5 and 6 were immersed for 5 days at 80° C. in aqueous base of different pH and the change in water content is determined after subsequent re-equilibration in water at pH=7. The results are shown below:

| Polymer of Example | Equilibrium Swelling in Water (%)[1] | | |
|---|---|---|---|
| | Initial | After 5 days/80° C. | 24 days/80° C. |
| | | at pH = 14 | at pH = 10 | at pH 10 |
| 5 | 25.4 | 73 | 50 | 52 |
| 6 | 25.8 | disintegrated | 59 | 72 |

[1] $\frac{\text{wetweight} - \text{dryweight}}{\text{wet weight}} \times 100$

The urea-styryl based PDMS-hydrogel of Example 5 is considerably more resistant to base catalyzed hydrolysis than the urea-methacrylate analog of Example 6.

The following examples describe the synthesis of chain extended macromers.

EXAMPLE 7

9.045 g (5.53 m equiv. amine) of an α,ω-di-propylamino-poly-(dimethyl siloxane) of MW 1636 (Shin Etsu Corp. No. X-22-161A) are placed in a 1 oz. jar; 4.56 g of hexafluoroisopropyl methacrylate (F$_6$MA) are added and the mixture is stirred and cooled in an ice-water bath. 0.21 g (0.9546 m moles) of isophorone diisocyanate (IPDI) are added and the mixture is stirred for 2 hours at room temperature until all isocycanate has disappeared (by IR). Then 1.85 g (9.22 m moles) m-isopropenyl-α,α-dimethylbenzyl isocyanate (TMI) are added and the mixture is stirred for 2 more hours to yield a clear viscous liquid of a 70.90% solution of α-methyl styrene capped, chain extended poly(dimethyl siloxane) of MW 2426 (calculated) in F$_6$MA.

EXAMPLES 8–10

The procedure of Example 7 is repeated but using the molar ratios of α,ω-di-propylamino-poly-(dimethyl siloxane) to IPDI as listed below:

| Example # | Mol Ratio of Diamine to IPDI | Calculated MW after Capping with equiv. TMI |
|---|---|---|
| 7 | 6:1 | 2426 |
| 8 | 4:1 | 2693 |
| 9 | 2:1 | 4023 |
| 10 | 3:2 | 6019 |

EXAMPLE 11

Using the PDMS-macromer mixture of Example 2, a solution is prepared in a 100 mL jar which contains 30 g of the α-methylstyrene capped poly(dimethyl siloxane) macromer described in Example 2, 18 g trimethylcyclohexyl methacrylate (TMMA), 28 g hexafluoroisopropyl methacrylate (F$_6$MA), 9 g methacrylic acid (MAA) and 15 g ethylene glycol dimethacrylate (EDMA); 0.24 g BME are added and dissolved and the clear solution is degassed in vacuo and sparged with nitrogen.

The solution is filled into round polypropylene molds of 1 cm height and 9 mm diameter, which are placed into the openings of a flat tray. The polymerization is carried out in a box sparged with nitrogen by exposure to UV light from a SYLVANIA-Blacklite Blue fluorescent lamp for seven hours. Following removal of the molds from the boxes, the buttons are annealed at 100° C. for 1 hour, cooled to room temperature and pressed out of the mold. The clear buttons are cut into slices of appropriate thickness on a bone saw for measuring hardness and oxygen permeability.

EXAMPLES 12–22

Example 11 is repeated, but with compositions listed in the table below; all compositions contain 28% $F_6MA$ and 9% MAA. All polymers are tested as described.

| Example No. | Composition Macromer of Ex. | % | TMMA % | EDMA % | Hardness Shore-D) | Oxygen Permeability $O_2.DK$ (barrers) at 0.25 mm/21° C. |
|---|---|---|---|---|---|---|
| 12 | 7 | 40 | 8 | 15 | 72 | 62 |
| 13 | 7 | 45 | 3 | 15 | 68 | 72 |
| 14 | 8 | 40 | 8 | 15 | 72 | 57 |
| 15 | 8 | 45 | 3 | 15 | 68 | 70 |
| 16 | 9 | 40 | 8 | 15 | 71 | 60 |
| 17 | 9 | 45 | 3 | 15 | 67 | 82 |
| 18 | 10 | 40 | 8 | 15 | 70 | 61 |
| 19 | 10 | 45 | 3 | 15 | 66 | 84 |
| 20 | 2 | 40 | 8 | 15 | 71 | 52 |
| 21 | 2 | 45 | 3 | 15 | 69 | 69 |
| 22 | 2 | 40 | 3 | 20 | 65 | 82 |

What is claimed is:

1. A contact lens formed from a polymer, which comprises the crosslinked copolymerization product of (A) from about 10 to about 100% by weight of said polymer of a polysiloxane macromer of formula A-1 or A-2:

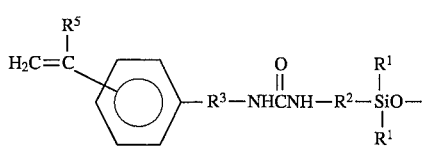

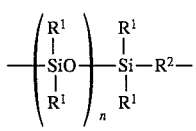

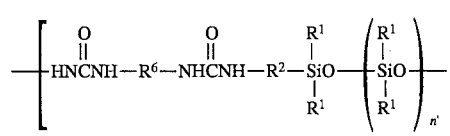

-continued

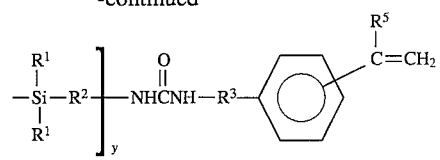

or $$(R^1)_3Si\text{---}O(Si(R^1)_2O)_m\text{---} \quad (A-2)$$

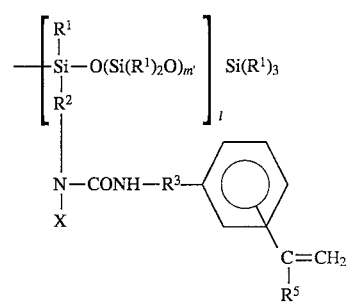

wherein $R^1$ is a methyl-, phenyl or 3,3,3-trifluoropropyl radical, $R^2$ is a divalent saturated linear or branched hydrocarbon radical of from 1–6 carbon atoms, $R^3$ is a direct bond or has the same definition as $R^2$, $R^5$ is hydrogen or methyl, $R^6$ is the divalent residue of a aliphatic, cycloaliphatic or aromatic diisocyanate of structure $OCN\text{---}R^6\text{---}NCO$, n and n' are integers from 2 to 250, with the proviso that the sum n+n' is not greater than 250, m and m' are integers from 2 to 200, with the proviso that the sum of m+m' is not greater than 250, y is 0–2, l has a value of 1 to 10, X is hydrogen or has the structure E

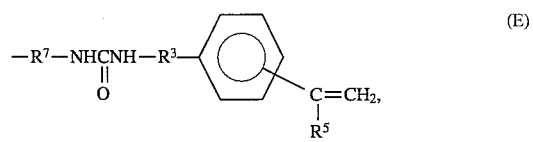

wherein $R^7$ has the same definition as $R^2$.

wherein said polysiloxane macromer has a number average molecular weight from about 400 to about 10,000, said macromer containing at least two terminal polymerizable olefinic groups, said groups being attached to the polysiloxane through a urea linkage; and (B) from 90% to 0% by weight of said polymer of one or more mono-, di- or trifunctional vinyl monomers polymerizable by free radical polymerization.

2. A contact lens formed from a polysiloxane-urea styrenic macromer of the structure:

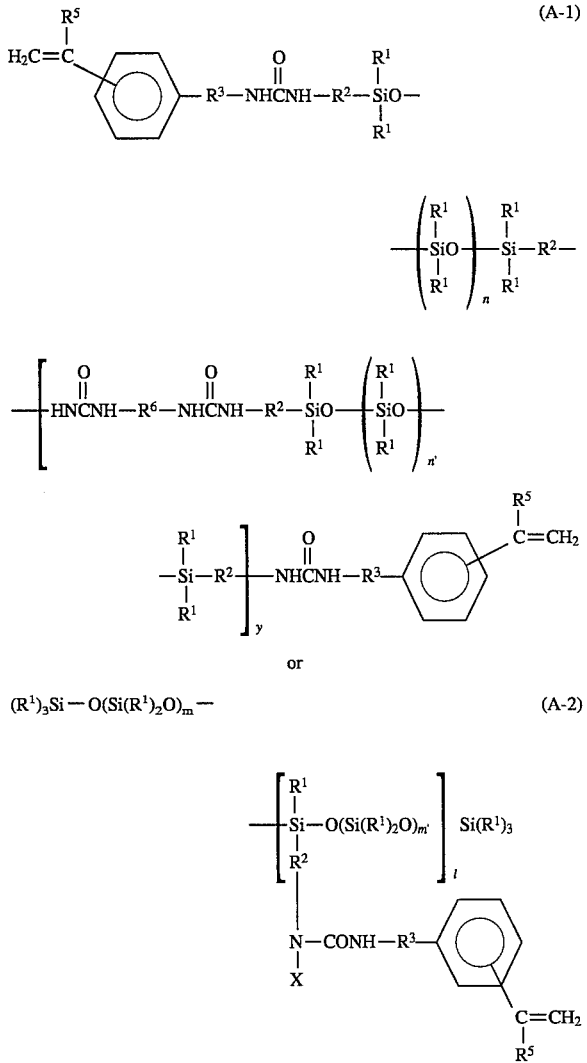

(A-1)

or $(R^1)_3Si—O(Si(R^1)_2O)_m—$ (A-2)

wherein $R^1$ is a methyl-, phenyl or 3,3,3-trifluoropropyl radical, $R^2$ is a divalent saturated linear or branched hydrocarbon radical of from 1–6 carbon atoms, $R^3$ is a direct bond or has the same definition as $R^2$, $R^5$ is hydrogen or methyl, $R^6$ is the divalent residue of a aliphatic, cycloaliphatic or aromatic diisocyanate of structure

OCN—$R^6$—NCO, n and n' are integers from 2 to 250, with the proviso that the sum n+n' is not greater than 250, m and m' are integers from 2 to 200, with the proviso that the sum of m+m' is not greater than 250, y is 0–2, l has a value of 1 to 10, X is hydrogen or has the structure E

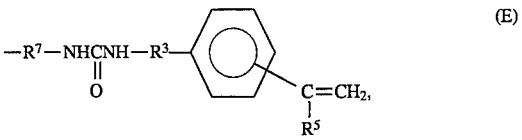

(E)

wherein $R^7$ has the same definition as $R^2$.

3. A contact lens according to claim 2 formed from a macromer of structure A-1, in which $R^1$ are methyl, $R^2$ is trimethylene, $R^3$ is —$C(CH_3)_2$—

$R^5$ is methyl, y is zero, and n is 5 to 100.

4. A contact lens according to claim 2 formed from a macromer of structure A-1, in which $R^1$ are methyl, $R^2$ is trimethylene, $R^3$ is —$C(CH_3)_2$—

$R^5$ is methyl, y is 1, n+n' is 10–20, and $R^6$ is an aliphatic or aromatic diradical residue with 6–12 carbon atoms.

5. A contact lens to claim 2 formed from a macromer of structure A-2, wherein $R^1$ are methyl, $R^2$ is trimethylene, $R^3$ is —$C(CH_3)_2$—

$R^5$ is methyl,

X is of structure E, $R^7$ is ethylene, m and m' are 5 to 100, with the sum of m+m' not greater than 150, and l is 1–3.

6. A contact lens according to claim 3 formed from a macromer of structure A-1, wherein n is 10–50.

7. A contact lens according to claim 2 formed from a macromer wherein $R^3$ is a direct bond and $R^5$ is hydrogen with the —$CR^5$=$CH_2$ group being in the para position relevant to $R^3$; or wherein $R^3$ is —$C(CH_3)_2$— and $R^5$ is methyl with the —$CR^5$=$CH_2$ group being in the meta position relevant to $R^3$.

8. A contact lens according to claim 2 wherein the diisocyanates of formula OCN—$R^6$—NCO are selected from the group consisting of ethylene diisocyanate, 1,2-diisocyanatopropane, 1,3-diisocyanatopropane, 1,6-diisocyanatohexane, 1,2,-diisocyanatocyclohexane, 1,3-diisocyanatocyclohexane, 1,4-diisocyanato-benzene; bis-(4-isocyanatophenyl)methane, 1,2- and 1,4-toluene diisocyanate; 3,3-dichloro-4,4'-diisocyanatobiphenyl; tris-(4-isocyanatophenyl)methane, 1,5-diisocyanato-naphthalene, hydrogenated toluene diisocyanate; isophorone diisocyanate; 1,6-diisocyanato-2,2-4-(2,4,4)-trimethylhexane, 2,2'-diisocyanatodiethyl fumarate; 1,5-diisocyanato-1-carboxypentane; 1,2-, 1,3-, 1,6-, 1,7-, 1,8-, 2,7- and 2,3-diisocyanatonapthalene; 2,4- and 2,7-diisocyanato-1-methylnaphthalene; 1,4-diisocyanato-methylcyclohexane; 1,3-diisocyanato-6(7)-methylnapthalene; 4,4'-diisocyanatobiphenyl;4,4'-diisocyanato-3,3'-dimethoxybiphenyl; 3,3'- and 4,4'-diisocyanato-2,2'-dimethylbiphenyl; bis-(4-isocyanatophenyl)ethane and bis(4-isocyanatophenyl) ether.

9. A contact lens according to claim 8 wherein the diisocyanate is isophorone diisocyanate, 2,2,4-(2,4,4)-trimethylhexane-1,6-diisocyanate or 1,2- or 1,4-toluene diisocyanate.

* * * * *